3,644,566
SILICON ACRYLIC COPOLYMERS
Richard D. Kincheloe, Kansas City, Mo., and Joseph H. Scherrer, Shawnee Mission, Kans., assignors to Cook Paint & Varnish Company, Kansas City, Mo.
No Drawing. Continuation of application Ser. No. 563,074, July 6, 1966. This application Nov. 17, 1970, Ser. No. 79,850
Int. Cl. C08f 35/02, 29/36; C08g 47/10
U.S. Cl. 260—826                                    13 Claims

ABSTRACT OF THE DISCLOSURE

A silicon-acrylic copolymer of a hydroxy functional acrylic copolymer and an alkoxy functional polyorganosiloxanes. The hydroxy functional acrylic copolymer may consist of a copolymer of hydroxy propyl methacrylate and, for example, a styrene. The silicon-acrylic copolymer may be combined with maleamine-formaldehyde resins or the like to provide coating compositions.

---

This application is a continuation of Ser. No. 563,074, filed July 6, 1966, now abandoned.

This invention is directed to a novel class of copolymers. More specifically, this invention is directed to a novel class of film-forming silicon-acrylic copolymers, the method of producing the same, and to coating compositions made from the silicon-acrylic copolymers.

Acrylic polymer and copolymer based latex paints have been used for years for interior uses. More recently, acrylic paints have been used for outdoor applications, in place of the alkyd paints, for example. However, these acrylic paints, or coating compositions, have not had the exceptional outdoor durability required for certain uses, i.e., for coating prefabricated multistored metal buildings and metal accessories for buildings. Such applications, due to the very high cost of maintenance painting, require a coating composition with exceptional durability.

It is an object of this invention to provide a novel class of silicon-acrylic copolymers.

It is another object of this invention to provide a novel class of copolymers from the reaction of hydroxy or alkoxy functional polyorganosiloxanes with a hydroxy functional acrylic polymer.

It is a further object of this invention to provide a process for producing a novel class of silicon-acrylic polymers.

It is yet another object of this invention to provide coating compositions, based upon a novel class of silicon-acrylic polymers, which exhibit outstanding durability.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The above objects are obtained by the present invention, wherein novel silicon-acrylic copolymers are obtained by reacting hydroxy, methoxy or other alkoxy functional polyorganosiloxane with a hydroxy functional acrylic polymer. The copolymers so obtained are used alone or in combination with other polymeric materials, preferably nitrogen-containing resins such as melamine-formaldehyde, urea formaldehyde or blocked isocyanate resins, as the major film-forming component of coating compositions.

While most, if not all, hydroxy or alkoxy functional polyorganosiloxanes may be used in practicing this invention, one of the preferred types of polyorganosiloxanes is a hydroxy functional polyorganosiloxane produced by Dow Corning (Z–6018) and General Electric (SR–188). This material is believed to have the following structure:

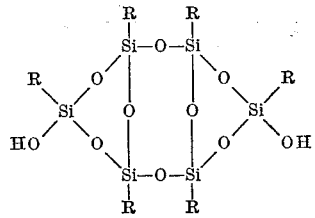

wherein R may be alkyl or aryl, and is principally phenyl. This product has the following specifications:

Hydroxyl content _____ 3.9
Average molecular weight _____ 1600
Combining weight _____ 400
Physical form _____ White powder Polyorganosiloxane Z–6018 will react with hydroxyl groups according to the following equation:

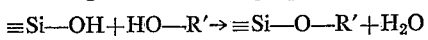

where R' is the residue of an acrylic polymer.

The other preferred polyorganosiloxane of this invention is a methoxy functional polyorganosiloxane produced by Dow Corning (Z–6188) and General Electric (SR–191). This silicone resin intermediate has a methoxy content of about 15% and has the following general structure:

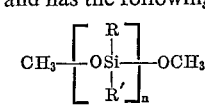

wherein $n$ is a positive integer, R is phenyl and R' is selected from the group consisting of methyl and methoxy. The preferred methoxylated silicone is dimethyl-triphenyl-trimethoxysiloxane, which has the following physical properties:

Physical form: Liquid
Methoxy content: 14–16%
Viscosity: B–E
Combining weight: 190 to 210

Preferably $n$ is 1 to 10, and most preferably $n$ is 3. This polyorganosiloxane will react with active hydroxyl groups with the elimination of methanol according to the following equation:

$$\equiv Si-O-CH_3 + HO-R' \rightarrow \equiv Si-R' + CH_3OH$$

where R' has the meaning given above. This reaction may be accelerated by the addition of an alkyl titanate such as tetraisopropyl titanate or tetrabutyl titanate.

The scope of the present invention contemplates the use of any polyorganosiloxane of the formula:

These polyorganosiloxanes may be prepared by the methods disclosed in any of the following U.S. Pats.: 2,724,704 Millar; 2,589,243 Goodwin; 2,571,029 Goodwin; 2,605,243 Sowa; 2,663,694 Millar; 2,584,341 Goodwin; 2,584,342 Goodwin; 2,584,340 Goodwin; 2,821,518 Edelman; 3,044,980 Modic; 2,735,825 Kress; 3,044,979 Saville; 2,584,344 Goodwin; 2,584,343 Goodwin; and especially 2,717,900 Plueddemann and 2,587,295 Doyle. The disclosures of these patents are hereby incorporated by reference.

The hydroxy or alkoxy functional polyorganosiloxane is reacted with an acrylic polymer, at least part of which is produced from a hydroxyl functional monomer.

Although any acrylic monomer with an active hydroxyl radical may be used to produce the hydroxyl functional acrylic polymer used in this invention, the preferred monomers are hydroxyethyl methacrylate, hydroxypropyl methacrylate, alkyl or benzyl esters of hydroxypropyl maleates, and the like. These monomers may be the sole constituents of the acrylic polymer or they may be polymerized with other monomers such as hydroxy-free alkyl acrylates and methacrylates, acrylic acid, methacrylic acid, styrene, vinyl acetate, vinyl chloride, vinylidene chloride and the like. In general, any $\alpha,\beta$-ethylenically unsaturated hydroxy-free compounds may be used as comonomers.

The reactions involved in carrying out the invention are: (1) polymerizing acrylic monomers to produce a hydroxyl containing acrylic polymer and (2) reacting the hydroxyl containing acrylic polymer with a polyorganosiloxane to produce the silicon-acrylic copolymers.

Solvents for the acrylic polymerization may be water or any of the commonly known organic solvents for acrylic resins, such as Cellosolve acetate, xylene, and petroleum fractions such as Enco Solvent No. 150. Catalysts for the polymerization may be peroxides such as di-t-butyl peroxide or cumene hydroperoxide or, when the solvent is water, ammonium persulphate or the like.

The acrylic monomers are generally polymerized at a temperature of 20 to 200° C., preferably about 100 to 165° C. and, preferably with stirring and refluxing. The catalyst may be in amounts 0.1 to 2.0 percent by weight, based on the weight of the acrylic polymer produced, preferably 0.5 to 1.5 percent.

The polyorganosiloxane is reacted with the acrylic polymer at a temperature of 50 to 200° C., preferably 100 to 150° C. The polyorganosiloxane may be added to the acrylic polymer as a solution in the reaction solvent which may additionally contain a catalyst for the siloxane-acrylic reaction. Generally, no catalyst is used for reactions with hydroxy functional polyorganosiloxanes but alkyl titanates such as tetraisopropyltitanate, or tetra butyl titanate may be used to catalyze the reaction of the methoxy functional polyorganosiloxanes.

The siloxane-acrylic reaction is preferably carried out in a suitable organic solvent such as Cellosolve acetate or xylene. A viscosity stabilizer, such as butyl alcohol, may be added to stabilize the reaction product.

The proportion of hydroxy functional acrylic monomers to the comonomers, when such are used to produce the acrylic polymer, and the proportion of polyorganosiloxane to acrylic polymer may vary widely, depending on the properties desired in the final silicon-acrylic copolymers. The preferred amount of polyorganosiloxane is from 5 to 50 percent. The hydroxy functional acrylic copolymer will contain sufficient hydroxy monomer to completely react with the methoxy or hydroxyl groups contained in the polyorgano siloxane. In addition, it is also preferred that the acrylic copolymer contain excess hydroxyl groups to give the finished silicone-acrylic copolymer a hydroxyl number of from 10 to 100.

Although the proportion range of polyorganosiloxane to the acrylic polymer may vary from 5 to 50 percent by weight of the silicon-acrylic copolymer, the polyorganosiloxane is preferably present in amount comprising 20 to 40 percent of the silicon-acrylic copolymer.

The silicon-acrylic copolymer of this invention may be used alone as the sole film-forming component of a coating composition, or may be blended with other film-forming resins, preferably nitrogenous resins. When the silicon-copolymer is the sole film-forming component, it is preferably plasticized with a plasticizer such as butyl benzyl phthalate (for example, Monsantos' Santicizer 160). The coating compositions may be pigmented with titanium dioxide or any other commonly used pigment. In addition, the coating composition may contain other commonly used adjuvants, such as extenders, fungicides, etc.

When the silicon-acrylic copolymer of this invention is blended with other film-forming resins, the silicon-acrylic copolymer may comprise 60 to 95 percent, preferably 80 to 90, of the total film-forming components in the coating composition.

The invention is illustrated by the following examples wherein parts by weight unless otherwise indicated:

EXAMPLE I

A mixture of methyl methacrylate (18.3 parts), hydroxypropyl methacrylate (11.4 parts) and di-t-butyl peroxide (0.7 part) was added dropwise over a three-hour period to a stirred, refluxing mixture of Cellosolve acetate (20.5 parts) and xylene (20.5 parts). The mixture was refluxed (approximately 140° C.) an additional 3½ hours and then cooled to 60° C. General Electric Silicone intermediate SR–188 (28.6 parts) was added and the mixture was refluxed (removing water) for six hours. The resin was then reduced to 40% solids with xylene. The final resin was a clear viscous solution haivng a Gardner-Holdt viscosity of $Z_1$–$Z_2$.

EXAMPLE II

A mixture of methyl methacrylate (33.2 parts), hydroxy propyl metthacrylate (3.6 parts) and di-t-butyl peroxide (0.9 part) was added dropwise over a three-hour period to a stirred, refluxing mixture of Cellosolve aceate (26.6 parts) and xylene (26.6 parts). The reaction was refluxed (approximately 140° C.) for an additional 3½ hours and then cooled to 60° C. Dow Corning Silicone intermediate Z–6018 (9.1 parts) was added and the mixture was refluxed (removing water) for six hours. It was then reduced to 40% solids with xylene. The final resin was a clear solution having a Gardner-Holdt viscosity of F–G.

EXAMPLE III

A mixture of hydoxypropyl methacrylate (11.82 parts), ethyl acrylate (24.12 parts), styrene (12.06 parts) and di-t-butyl peroxide (.96 part) was added dropwise over a 3½ hour period to refluxing Enco Solvent #150 (12 parts). The mixture was allowed to reflux (165° C.) four hours longer. It was then cooled to 120° C. and a solution of Dow Corning Silicone intermediate Z–6188 (12 parts) and tetraisopropyl titanate (.6 part) in cellosolve acetate (25.02 parts) was added. After refluxing (145° C.) for 4 hours the reaction was cooled to 100° C. and butyl alcohol (2 parts) was added to stabilize the viscosity. The product had a Gardner-Holdt viscosity of T–U at 60% solids.

EXAMPLE IV

A mixture of hydroxyethyl methacrylate (18.6 parts), acrylic acid (.7 part), ethyl acrylate (10.6 parts), styrene (5.48 parts) and cumene hydroperoxide (.24 part) was added dropwise over a 3-hour period to a stirred, refluxing solution of xylene (10.25 parts), cellosolve acetate (5 parts) and Enco Solvent #150 (12.75 parts). The mixture was refluxed for 1 hour and an additional quantity of catalyst (cumene hydroperoxide, 35 parts) was added. The reaction was allowed to reflux 4 hours longer. It was then cooled to 110–120° C. and a mixture of Dow Corning Silicone intermediate Z–6188 (15 parts), tetraisopropyltitanate (.03 part) and cellosolve acetate (19 parts) was added. The reaction was held at reflux temperature (removing methanol) until the viscosity reached Y–Z (Gardner-Holdt). Butyl alcohol (2 parts) was then added to stabilize the viscosity. The final product had a Gardner-Holdt viscosity of X–Y at 49% solids and an acid number of 18.

EXAMPLE V

A monomer mixture containing hydroxypropyl methacrylate (19 parts), acrylic acid (.75 part), ethyl acrylate (10.45 parts), and styrene (5.3 parts) was added simultaneously with a solution of ammonium persulfate (.3 part) in water (12 parts) to refluxing water (52.2 parts)

over a 4-hour period. After the addition was complete, the emulsion was refluxed an additional 30 minutes and then cooled to room temperature. The polymer was precipitated, filtered, washed with water and air dried. It was dissolved in a 1:1 mixture of xylene-cellosolve acetate at approximately 35% solids. Any residual water remaining was removed by axeotropic distillation.

The polymer solution (68.62 parts) was then heated to 120° C. and a mixture of General Electric Silicone Resin intermediate SR–191 (10.5 parts) and tetraisopropyltitanate (.02 part) in cellosolve acetate (10.86 parts) was added. The mixture was refluxed to a Gardner-Holdt viscosity of X–Y, and butyl alcohol (10 parts) was added for stability. The final product had a viscosity of P (Gardner-Holdt) at 34% solids and an acid number of 22.

EXAMPLE VI

A mixture of hydroxypropyl methacrylate (11.6 parts), acrylic acid (.03 part), ethyl acrylate (21.8 parts), styrene (10.85 parts) and cumene hydroperoxide (.3 part) was added dropwise over a 3-hour period to the refluxing solvent (10.25 parts of xylene and 12.75 parts of Enco Solvent #150). One hour after the addition was complete, a second portion of catalyst (.45 part of cumene hydroperoxide) was added. The reaction mixture was allowed to reflux an additional 3 hours. After cooling to 100° C. a solution of Dow Corning Silicone intermediate Z–6188 (5 parts) and tetraisopropyl titanate (.02 part) in cellosolve acetate (24.95 parts) was added, and the reaction was allowed to proceed at reflux (150° C.) for 1 hour. It was then cooled to 100° C. and butyl alcohol (2 parts) was added to stabilize the viscosity. The product had a Gardner-Holdt viscosity of $Z_2$–$Z_3$ (at 47% solids) and an acid number of 11.

EXAMPLE VII

A blend of 20 parts resin from Example I and 1.5 parts of butyl benzyl phthalate (Santicizer 160, a product of Monsanto) was drawn down on glass plate and baked 30 minutes at 300° F. The resulting film was clear and glossy, having a Sward hardness of 70.

EXAMPLE VIII

Twenty parts of resin from Example II were blended with 1.6 parts butyl benzyl phthalate (Santicizer 160, a product of Monsanto) and drawn down on glass plate. After baking for 30 minutes at 300° F., the films were glossy and clear and having a Sward hardness of 66.

EXAMPLE IX

A blend of 100 parts of acrylic-silicone copolymer resin from Example III and 4 parts of hexakismethoxymethylol melamine was pigmented with titanium dioxide. The resulting coating was drawn down on an aluminum panel and baked for 2 minutes at 550° F. The film had a pencil hardness of 3H, good gloss and mar resistance.

EXAMPLE X

Melamine crystals (20.6 parts), butyl formcel (61.4 parts), butyl alcohol (17.4 parts), phthalic anhydride (0.15 part), and magnesium carbonate (0.33 part) were heated to reflux and water removed azeotropically until a solution at 50 non-volatiles in equal parts of butanol and xylol has a viscosity of L–P (Gardner-Holdt). The resulting amino resinous solution in butanol/xylol may be used directly for preparing products of the invention (or examples).

One hundred parts of resin from Example IV were blended with 10 parts of the melamine-formaldehyde resin produced above and pigmented with titanium dioxide. An aluminum panel was coated with the enamel thus prepared and baked for 2 minutes at 550° F. The film exhibited good solvent and mar resistance with a pencil hardness of 3H.

EXAMPLE XI

To one hundred parts of resin from example VI was added 3 parts hexakismethoxymethylol melamine (Cymel 301, a product of American Cyanamid) and pigmented with titanium dioxide. The resultant coating was applied to an aluminum panel and baked 120 seconds at 550° F. The film had good solvent resistance, good flexibility and a pencil hardness of H.

What is claimed is:
1. A silicon-acrylic copolymer comprising:
   (a) a hydroxy alkyl acrylic polymer wherein the hydroxy alkyl is the sole functional substituent and is selected from the group consisting of hydroxyethyl and hydroxypropyl; and
   (b) from 5 to 50% by weight of (a) of alkoxy functional polyorganosiloxane
      wherein the organo substituents are selected from alkyl and phenyl and the alkoxy groups are attached directly to silicon, the number of hydroxy groups in (a) being at least sufficient to react with all of the alkoxy groups in the polyorganosiloxane and substantially all of said alkoxy groups being so reacted to give a product having a hydroxyl number of from 10 to 100.
2. A silicon-acrylic copolymer according to claim 1 wherein component (a) is copolymer of a hydroxypropyl methacrylate and a hydroxy-free α,β-ethylenically unsaturated monomer copolymerizable with said methacrylate.
3. A coating composition including the copolymer of claim 1 and a film-forming coating resin selected from the group consisting of melamine-formaldehyde resins and urea-formaldehyde resins.
4. The coating composition of claim 3 wherein the alkoxy functional polyorganosiloxane has the general formula:

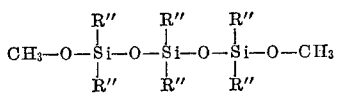

wherein R'' is selected from the group consisting of alkyl, phenyl and alkoxy.
5. The coating composition of claim 4 wherein the methoxy functional polyorganosiloxane is dimethyl-triphenyl-trimethoxysiloxane.
6. The silicon-acrylic copolymer of claim 2 wherein the hydroxy functional acrylic copolymer is a copolymer of hydroxy propyl methacrylate and a member selected from the group consisting of lower alkyl esters of acrylic acid, lower alkyl esters of methacrylic acid, and mixtures thereof.
7. The silicon-acrylic copolymer of claim 1 wherein the hydroxy functional acrylic copolymer is a copolymer of hydroxy ethyl methacrylate and a hydroxy-free α,β-ethylenically unsaturated compound.
8. The silicon-acrylic copolymer of claim 2 wherein the alkoxy functional polyorganosiloxane has the structure:

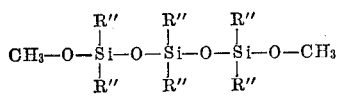

wherein R'' is selected from the group consisting of alkyl, phenyl and alkoxy.
9. The silicon-acrylic copolymer of claim 8 wherein the alkoxy functional polyorganosiloxane is dimethyl-triphenyl-trimethoxy-siloxane.

10. The method of producing silicon-acrylic copolymers comprising (a) polymerizing a hydroxy alkyl acrylic monomer and a hydroxy-free α,β-ethylenically unsaturated monomer copolymerizable therewith at a temperature of 20 to 200° C. to form a hydroxy alkyl acrylic copolymer wherein the hydroxy alkyl is the sole functional substituent and is selected from the group consisting of hydroxyethyl and hydroxypropyl, and (b) reacting the hydroxy alkyl acrylic copolymer with 5 to 50% by weight of an alkoxy functional polyorganosiloxane, at a temperature of 50 to 200° C., to form a silicon-acrylic copolymer, the organo substituents in said polyorganosiloxane being selected from the group consisting of alkyl and phenyl and the alkoxy groups being attached directly to silicon, the number of hydroxy groups in (a) being at least sufficient to react with all of the alkoxy groups in the polyorganosiloxane and substantially all of said alkoxy groups being so reacted to give a product having a hydroxyl number of from 10 to 100.

11. The method of claim 10 wherein the hydroxy functional acrylic comonomer is reacted with 30 to 40% by weight of the polyorganosiloxane.

12. The method of claim 10 wherein the methoxy functional polyorganosiloxane has the formula:

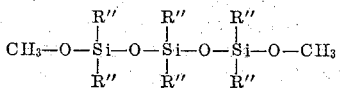

wherein R″ is selected from the group consisting of alkyl, phenyl and alkoxy.

13. The method of claim 12 wherein the methoxy functional polyorganosiloxane is dimethyl-triphenyl-trimeythoxysiloxane.

References Cited

UNITED STATES PATENTS 3,468,836   9/1969   Sekmakas _____ 260—826

SAMUEL H. BLECH, Primary Examiner

U.S. Cl. X.R.

117—124 F, 132 BS; 260—31.8 S, 33.4 SB, 33.6 SB, 37 SB, 41 B, 827